UNITED STATES PATENT OFFICE.

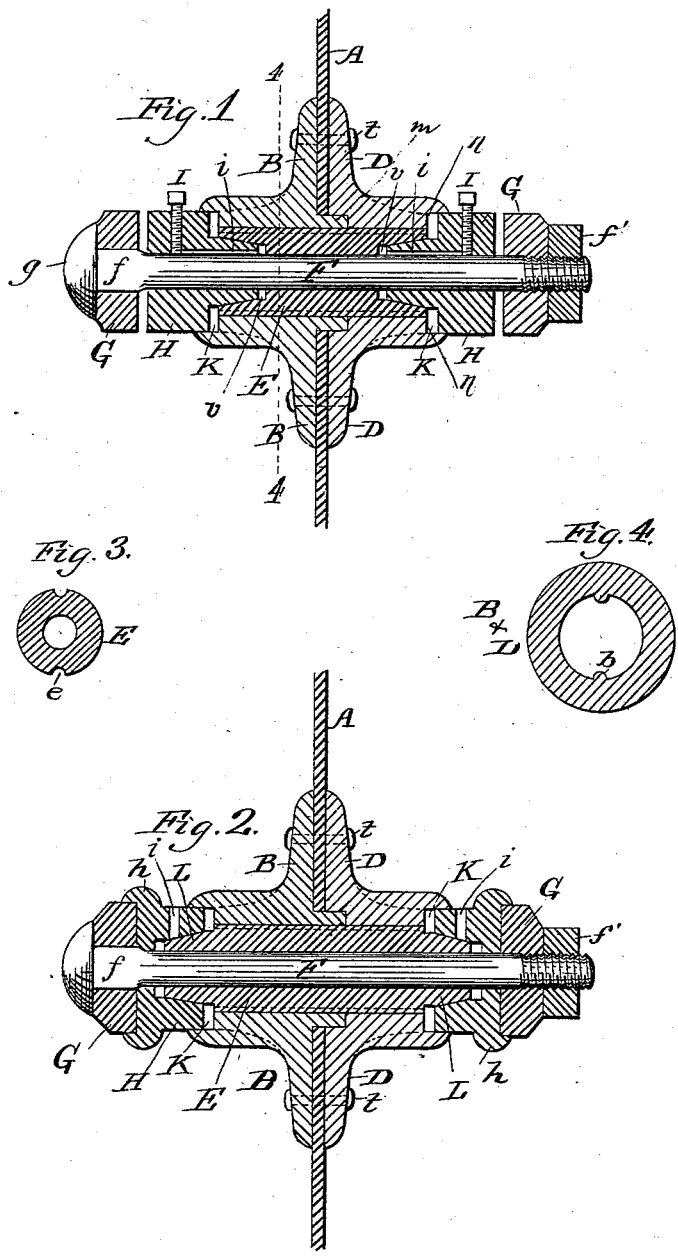

CHARLES R. HARTMAN, OF VINCENNES, INDIANA.

HUB OF COLTER FOR PLOWS.

SPECIFICATION forming part of Letters Patent No. 278,949, dated June 5, 1883.

Application filed January 24, 1882. (No model.)

*To all whom it may concern:*

Be it known that I, C. R. HARTMAN, of Vincennes, county of Knox, and State of Indiana, have invented certain Improvements in the Hubs of Colters for Plows, of which the following is a specification.

The object of my invention is to provide a compound hub for a wheel-colter for plows which shall hold the colter securely in a plane at right angles to the axle upon which it is mounted, shall hold it rigidly against moving either to the right or left on the axle, shall prevent its turning upon the same, and shall be cheaply manufactured, its parts being cast of metal, and easily and conveniently replaced when broken. I have accomplished that object by means of the constructions of parts, hereinafter described with reference to the accompanying drawings, in which—

Figure 1 represents a longitudinal central vertical section of the hub of a wheel-colter, sleeve on the axle, yoke-arms, and nut, illustrating my improvement; Fig. 2, a like section of the same parts, some of which, however, are somewhat varied in form, though equivalent in mechanical operation; Figs. 3 and 4, cross-sections of the sleeve E and hub-section B, taken as indicated by the broken lines 4 4 in Fig. 1, to indicate the longitudinal ribs in the interior of the hub-opening and the corresponding grooves in the exterior of sleeve E.

F indicates the axle or shaft, which is provided with a head at one end and a screw-nut, *f''*, at the other end; and *f* is an enlargement of the same in a square or polygonal form to prevent the axle from turning in the ends G of the yoke-arms, which extend out from a standard in the usual way. Upon this axle or shaft F is slipped the sleeve E, and upon its exterior are grooves *e*, to correspond with the interior longitudinal ribs, *b*, in the interior peripheries of the hub-sections B and D, which are placed upon and over the sleeve and prevent the turning of the hub composed of these two parts upon the sleeve. The two sections B and D embrace between their bodies and flanges the wheel-colter A, the flanges being fastened together at suitable distances from the body of the hub by the bolts *t;* and in order to render the two sections practically one solid piece, one of them—B, for instance—is made with an annular projection next to the sleeve E, extending at right angles to the colter and its own flange into a corresponding recess provided for it in the other section. The hub thus made up and the sleeve turn together on the shaft F. Each end of the sleeve is concaved or hollowed out in a cup-like form, as shown, so that when the sleeve revolves these cup-like recesses fit over and turn upon correspondingly-beveled extensions of bearing-pieces H, which are immovably fastened upon the axle F by means of set-screws I. The tapered ends of bearings H do not extend quite to the bottoms of the recesses in the outer ends of the sleeve E, and so leave annular spaces *v*, in which are placed washers, of leather or other suitable material, to prevent contact of the surfaces and to absorb and give out as required lubricating-oil, which is supplied through the screw-holes of set-screws I (the screws being removed for that purpose) and grooves *i*, which extend from the bottoms of the screw-holes to the annular recesses *v;* nor do the shoulders of the bearing-pieces extend quite up to the shoulders *n* of the hub-sections, and so leave other annular spaces, *k*, to answer the same purpose as those before described. The hub-sections are provided with annular projecting flanges *d* to completely inclose the last-described recesses, for the purpose of excluding dirt and other foreign matter.

The constructions shown in Fig. 2 are the same as in the above described in all essential points, the most marked difference being that in Fig. 2 the sleeve E, instead of being concaved in each end, as it is shown to be in Fig. 1, is convexed, so as to form sloping journals to turn in corresponding cup-like recesses in the bearings H, and the outer ends of the concaved bearings are provided with projecting lugs *h* to clasp the ends of the yoke-arms G and hold them firmly, and in Fig. 2 the oil-hole *i* is provided for oiling the journals of the end bearings, H.

What I claim as my invention, and desire to secure by Letters Patent, is—

1. The combination of the two hub-sections B and D, one of which is provided with a horizontal annular projection and the other with a corresponding recess for the same, and each with an annular flange, *d*, on its outer end, as well as an interior shoulder, and both with ribs *b* in their interiors, and the sleeve E, provided with corresponding grooves, $e$, upon its exterior, and at each end with tapered journals or equivalent bearings, substantially as described.

2. The hub-sections B and D, with their ribs and flanges $b\ d$, and the sleeve E, with its grooves $e$ and its bearings or journals, constructed as described and mounted upon shaft F, in combination with bearing-pieces H, adapted to afford the protected annular chambers $v\ k$, substantially as described.

CHARLES R. HARTMAN.

Witnesses:
 LOUIS A. MEYER,
 ADAM SMITH.